Patented Mar. 8, 1927.

1,620,229

UNITED STATES PATENT OFFICE.

JOHN H. REEDY AND WILLIAM S. BROCK, OF URBANA, ILLINOIS.

FUNGICIDE AND METHOD OF PREPARING SAME.

No Drawing. Application filed October 3, 1924. Serial No. 741,478.

This invention relates to methods of preparing sulphur in a very minutely divided form for use as a fungicide in spraying vegetation.

One of the objects of this invention is the preparation of sulphur in a very finely divided condition by a simple method.

Another object is the preparation of sulphur under controlled conditions in the form of a paste or powder which is economically transportable and which is immediately soluble or suspensible in water at the point of use.

It has long been known to use sulphur as a fungicide. Many difficulties have arisen, however, in the usual course of operation. Ordinary flowers of sulphur is not appreciably soluble, and owing to the large size of the granules is difficultly suspensible in aqueous solutions. For this reason it is usually preferred to combine it with calcium hydrate or quicklime in solution to form calcium polysulphid or lime-sulphur. This compound is very stable in the form of solutions, but when concentrated or dried, it tends to decompose. It is therefore, difficult to prepare a standard solution which will have a predetermined strength when applied by spraying.

According to the present process, a sulphur mixture is obtained which is immediately reducible to suspension by simple dilution, and which contains the sulphur in an available form. Owing to the exceedingly minute division and great re-active power of the sulphur, prepared according to this process, we prefer to designate it as "active" sulphur. The product has its sulphur in immediately available form, and is far more easily dispersed or suspended.

The process consists in the treatment of the lime sulphur or calcium polysulphid solution, with an equivalent amount of zinc sulphate. These substances re-act according to the following equation:

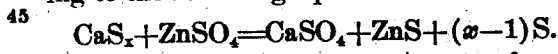

The calcium sulphate, zinc sulphid and sulphur are all in finely divided form.

An example of a suitable execution of the process is as follows:

To one gallon of standard lime-sulphur solution containing about sixty percent of calcium polysulphid is added about 7.7 pounds of pure zinc sulphate

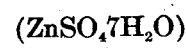

dissolved in water, either in small portions or continuously and with constant vigorous agitation.

In the course of the re-action, the yellowish color gradually disappears, which indicates the change of the lime-sulphur and affords a visual control at the end-point. This concentration gives a smooth, creamy product, which is suitably diluted with the usual agents before use.

It is preferable to execute this re-action on a large scale, so that the uniformity of the product may be assured. The concentrated material is economically transportable.

The active sulphur renders the spray highly effective and economical. The other ingredients serve as auxiliaries and as substances of production. If desired, the usual spreading and peptizing agents may be added to stabilize the spray, and to extend its action on plant foliage and the like.

Having thus described the invention, what we claim as new and desire to secure by Letters Patent, is—

1. The method of preparing a fungicide containing an intimate mixture of suspended sulphur, zinc sulphide and calcium sulphate in finely divided form which comprises the double decomposition of lime sulphur solution with zinc sulphate, and diluting the product obtained thereby.

2. The process of preparing an active sulfur fungicide containing zinc sulfide which comprises effecting a reaction between a lime-sulfur solution and a dissolved zinc salt, and diluting the product obtained thereby.

3. In a process of preparing active sulfur for a fungicide, the step of effecting a reaction between a lime-sulfur solution and a zinc sulfate solution.

4. A fungicide containing active sulfur, zinc sulfide, and calcium sulfate in suspended and finely divided form.

5. An aqueous fungicidal mixture including active sulfur and zinc sulfide in suspended and finely divided form.

In testimony whereof we affix our signatures.

JOHN H. REEDY.
WILLIAM S. BROCK.